Patented May 6, 1924.

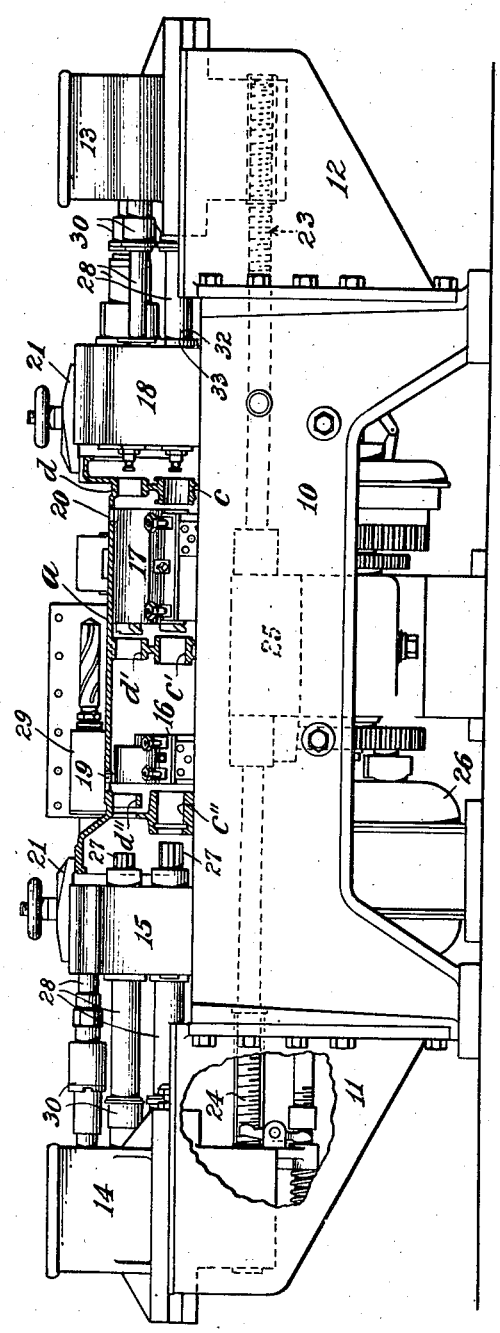

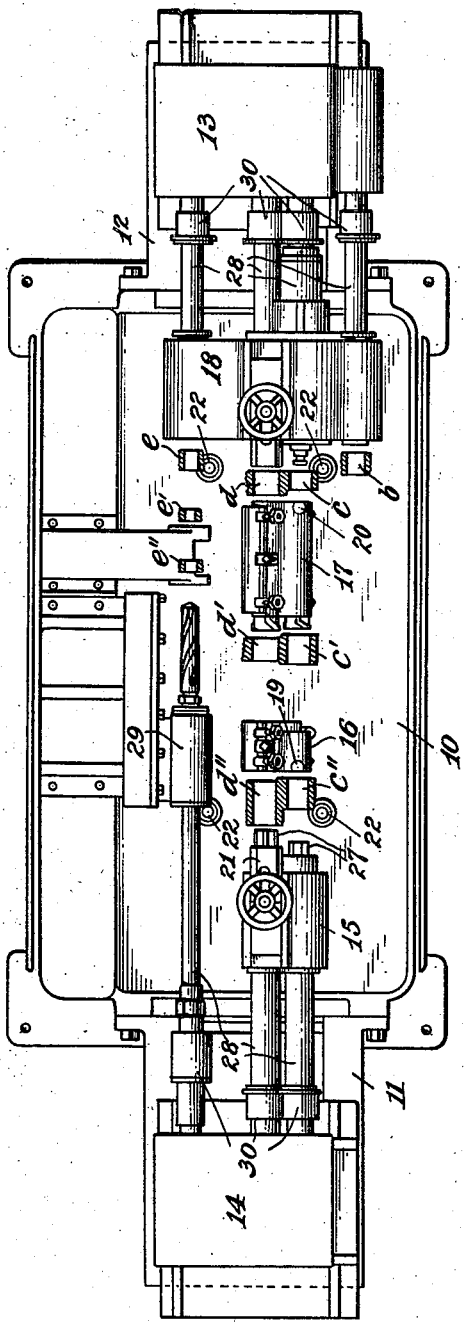

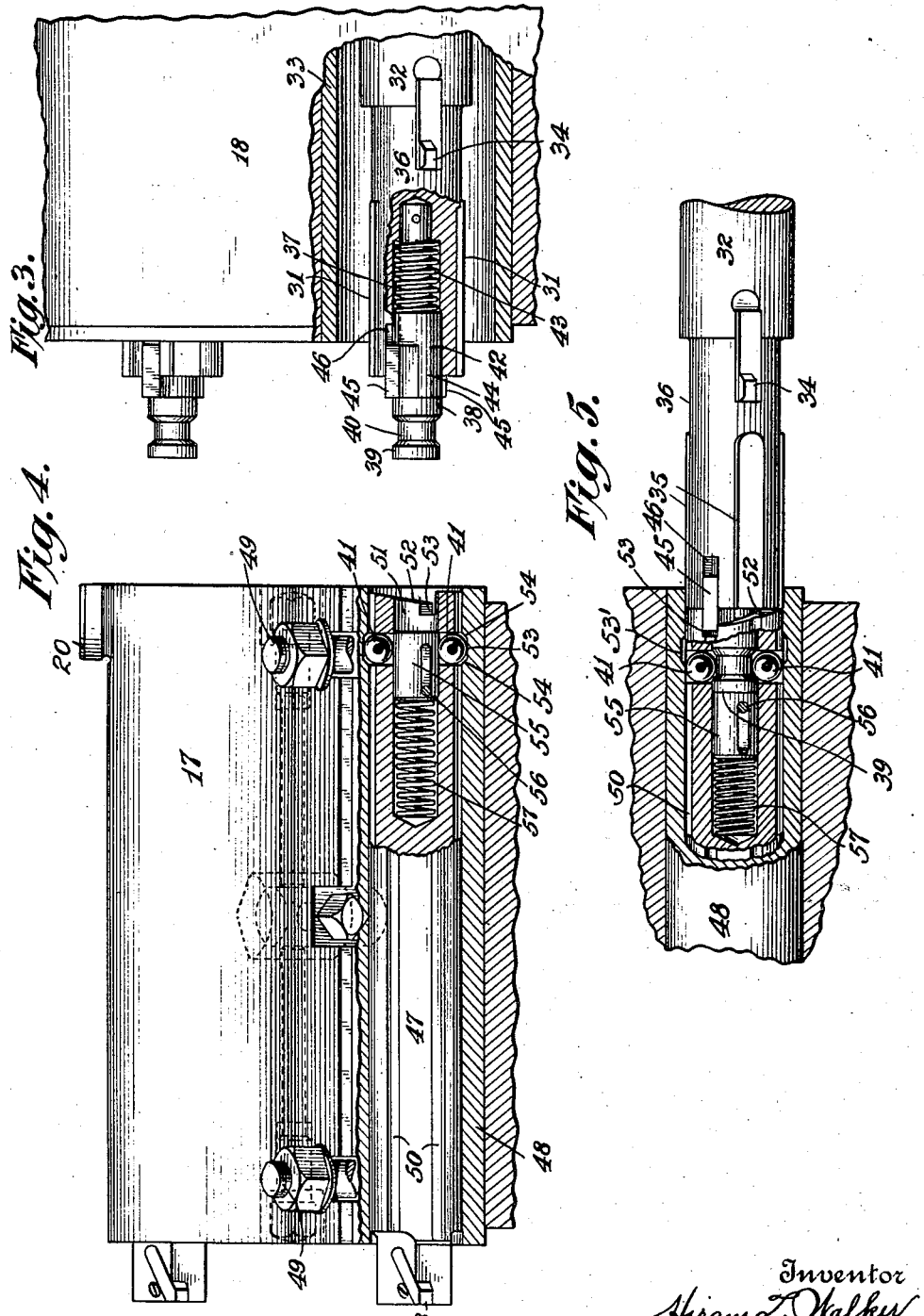

1,493,300

UNITED STATES PATENT OFFICE.

HIRAM L. WALKER, OF CLEVELAND, OHIO, ASSIGNOR TO CHANDLER MOTOR CAR COMPANY, OF CLEVELAND, OHIO, A CORPORATION OF OHIO.

CRANK AND CAM SHAFT LINE BORING MACHINE.

Application filed November 20, 1920. Serial No. 425,315.

*To all whom it may concern:*

Be it known that I, HIRAM L. WALKER, a citizen of the United States, and resident of Cleveland, in the county of Cuyahoga and State of Ohio, have invented certain new and useful Improvements in Crank and Cam Shaft Line Boring Machines, of which the following is a specification.

The invention relates in general to an improvement in the tool element of a boring or similar machining device for forming, reaming or truing holes in longitudinally spaced apart relation, and the invention specifically relates to a machine for effecting the rough boring and finish reaming operations in forming the different shaft bearings in an automotive crank case.

In automotive crank cases and similar devices to be machined, hereinafter identified as work parts, the different bearing for each of the shafts or other parts which must be disposed in alignment are frequently spaced apart material distances, usually too great to permit the machining with a single tool, and even where the distances to be reached by the tool are relatively short, the vibratory movement and chattering action inherent in the use of long drills, especially as they must sometimes be made of small diameter, introduce a factor of error which is not conducive to accuracy in the aligning of the bearings or other openings hereinafter referred to generically as holes.

Accordingly, one of the objects of the invention is to provide, as part of a conventional form of boring and reaming machine, a simple means for insuring the accurate machining of holes so that they will be accurately formed and concentrically disposed relative to a common axis of reference or rotation.

It is suggested in machining work parts of the type under consideration, to drill from opposite ends of the same and this is entirely satisfactory where but two bearings are to be machined. A difficulty, however, naturally arises when there is a necessity for drilling a third or fourth interior bearing, in that it would be necessary to demount the work with its outer drilled bearings and remount the partially drilled work in another machine designed to provide access to the interior bearings. Obviously, this introduced an element of error for it is practically impossible to insure the accurate relocating of centers of rotation and even when this is effected the incidental labor expense is economically impossible.

It has been the practice heretofore in machining the interior bearing in an automotive case to insert bars in each bearing in alignment and as many cutters in the bars as there are bearings to bore. This of course necessitates the preformation of the bearing holes to accommodate the bars and a manual setting of the cutters.

Accordingly another object of the invention is to provide an organization of parts which will permit of a single mounting of the casing or similar work in set position in which the actuation of the tools with the work in such set position will be sufficient for the machining or forming of any number of interior holes, and in which the operation will be inherent in the functioning of the machine and independent of any manual manipulation.

I attain this invention broadly by positioning along the line of boring a plurality of machining tools, one for each separate hole to be machined and separately journalling each tool in an accurately machined bearing and in close proximity to the work to be machined by that tool; and the invention otherwise features a form of tool and mounting thereof which will minimize any tendency of the tool to vibrate or chatter.

Tools of the character under discussion must be rotated as well as advanced longitudinally along their axes of rotation and as the work is not infrequently of massive and hard metal, it is necessary that powerful and, of course, relatively massive rotating as well as advancing means must be provided. However, due to the limited space available in some of the separated bearings for the tool, it is physically impossible to provide an independent drive for each of the tools. Accordingly, another object of the invention is to provide a simple form of organization which will supply the necessary power at the working points which may be distanced therefrom in a space sufficiently large to accommodate the massive power turning and feeding mechanism. In the present disclosure a power member is disposed in the available space at one end of the line of boring and is arranged so that it is positively connected to each succeeding tool in such a manner that each tool can be actuated with the full effective power available, irrespective of the limited permissible distance of longitudinal travel either in operatic sequence or all together.

Incidental to the last object another desideratum of the invention is to provide a form of shaft coupling by means of which each tool is positively locked in its bearing against longitudinal movement but which is automatically unlocked and becomes a driven member when engaged by the preceding driving member in the series.

Still another object of the invention is to provide in connection with the clutching devices between the driving and driven units an arrangement whereby each of the tools is restored to its normally locked position in its bearing on the retreat of the organization under the control of the power member in the actuation of the machine.

Still another object of the invention is to provide a form of tool and mounting therefor which will permit the ready and convenient replacement of work parts and the replacement of one type of cutting tool for another in passing from the drilling to the reaming or other machining operations.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a view largely in front elevation of a machine of the lathe type equipped with a preferred embodiment of the invention and showing a conventional form of automobile casing in vertical section in operative position thereon;

Figure 2 is a plan view looking down upon the machine shown in Figure 1;

Figure 3 is a fragmentary side view looking on the right hand boring bar guide shown in Figure 2 and with parts broken away axially of the primary shaft boring tool, or power shaft as the case may be, to show details of construction.

Figure 4 is a similar view of the secondary tool bearing with the secondary machining tool in normally locked position therein; and Figure 5 is a detailed view showing the power shaft of Figure 3 in interlocked driving relation with the secondary tool of Figure 4.

In this disclosure reference will be made to a machine for drilling the bearings in an automobile casing, because it is an excellent illustration of a situation where internal bearings are spaced a material distance from the end of work to be machined and which at the same time requires that the shaft bearings be accurately aligned, but it is to be understood that the showing is merely illustrative of one situation where the invention is applicable.

In the drawings there is shown a table shaped bed casing 10 at two opposite ends of which are bolted end extensions in the form of heavy brackets 11 and 12. The bracket 12 at the right end is provided with a front traveling head 13 and the bracket 11 at the opposite end is provided with a similar rear head 14. Projecting upwardly from the bed casting are four massive extensions identified in Figure 1 from left to right as the left boring bar guide 15, a combined cutter bar support and work locating member 16, a combined auxiliary tool guide and work locating member 17 and a right boring bar guide 18. Each of these projections is accurately aligned, bored and bushed with replaceable hardened steel bushings. In the case of the two center projections 16 and 17 it was found, under certain conditions, that it was impossible to use replaceable bushings, and for this reason part of the projections are replaced as a whole unit when worn.

Each of the projections 16 and 17 are provided respectively with an upstanding pilot 19 and 20 for locating the casing to be machined in proper position in the machine. This casing is of conventional form and includes a set comprising a generator shaft bearing $b$, cam shaft bearings $c, c'$ and $c''$, crank shaft bearings $d, d'$ and $d''$ and pump shaft bearings $e, e'$ and $e''$. The casing is secured in position by clamps 21 which force the same onto locating pins 22 and the casing is otherwise set in definite position in the machine by means forming no particular part of the present disclosure.

Each of the heads are advanced to and from the work by feed screws 23 and 24 mounted within the body of the machine and driven through the gear box 25 from the motor 26. Each of the bearings $b, c, d,$ and $e$ at one end and bearings $c'', d'', e'$ and $e''$ at the opposite end of the casing is designed to be machined by cutters carrying members 27 herein identified as primary cutters forming part of the boring bars 28, which are guided in the boring bar guides 15 and 18 and in the inset guide 29 for the pump shaft machining cutter. These cutters are rotated and advanced by their respective heads acting through couplings 30 which take up any disalignment between the parts of the boring bars and their driving shafts in the heads.

It will be understood that following conventional forms of such machines, each of the heads advance in the operative direction to machine the work first at high speed and then at a reduced working speed for a prescribed distance after which the heads retreat at relatively high speed back into their outer, normal position carrying with them the primary cutting tools.

Referring to the part of the machine featured in this disclosure reference will be made to the crank shaft bearings with their three distinct and longitudinally spaced apart bearings $d$, $d'$ and $d''$. It will be understood that the left hand primary cutter 27 drills and otherwise machines the bearing $d''$ and that the right hand cutter herein given the separate reference character 31 in Figures 3, 4 and 5 machines the right hand bearing $d$. The invention particularly relates to the instrumentalities for machining the intermediate or center bearing $d'$.

Referring to the detailed Figures 3 to 5 it will be noted that the right hand primary boring bar, given a separate reference character 32, has a close fit in the bearing 33 carried by the guide 18, as shown in Fig. 5. The bar is equipped with one or more of the cutting tools and for illustration there is shown a boring cutter or reaming tool 34. The advanced end of the bar is counterbored to provide a bore 37 in which is axially positioned a key 38 in the form of a pin, the inner end of which is fastened to the bar at the base of the bore and the outer active end of which projects beyond the free end of the bar. The key is provided at its outer end with a head 39 which head is provided with a peripheral groove 40 constituting a beveled sided locking groove for receiving the spherical locking members 41 hereinafter more fully described.

A rotary driving coupling 42 is slidably mounted on the key and is normally pressed in bearing engagement with the head thereof by means of a spring 43 which is housed within the bore and bears at opposite ends against the bar and coupling. The coupling includes a sleeve 44 guided in the bore and a pair of diametrically disposed and outwardly extending lugs 45 slidably mounted in slots 46 formed on the advance end of the reduced portion 36 of the bar.

An auxiliary tool 47 is rotatably and slidably mounted in a bearing sleeve 48 carried by the guide 17. The parts are accurately machined so that the axis of rotation of the tool 47 will coincide with the axis of rotation of the bar 32. Lubrication grooves 50 are provided between the tool 47 and its bearing sleeve and every effort is made to insure the maintenance of the tool in accurate symmetry about its axis so as to be free of any vibratory or chattering motion while in action. The end of the tool facing the primary bar 32 is drilled to provide a key receiving bore 51 and the edge of the tool at this end is cut away to provide a pair of bevel inclines 52 each leading to one of a pair of slots 53. This arrangement is to permit the guiding of the lugs 45 into a fitting engagement with the slots when the coupling is advanced into operative engagement with the auxiliary tool as shown in Figure 5.

The auxiliary tool is normally locked in position relative to its bearing and for this purpose the bearing 48 at the end adjacent the bore 52 is provided with an inwardly facing peripheral groove 53' having bevelled sides 54. The bored portion of the tool is drilled transversely to provide housings for the spherical locking member 41 which members are normally moved outwardly into the groove 53' by a follower 55 in the form of a plug slidably mounted in the bore 51 and held against displacement by a pin 56. The follower is normally held in projected position so as to hold the locking members in operative position by means of a spring 57 positioned in the bore 51 and bearing at opposite ends on the tool and follower.

The key 38 is so proportioned that as it advances into the bore 51 it engages the follower, moves the same inwardly compressing the spring 57 and permitting the locking members 41 to fall or to be pushed into the groove 40 as shown in Figure 5. The auxiliary tool is provided with an auxiliary cutting instrument 58 to machine the bearing $d'$ to the required size. This instrument like the other cutting elements is readily replaced and adjusted when desired or necessary.

In operation and assuming that the work is properly located and fastened in position, the machine is started and the outer bearings drilled, reamed or trued, in a manner which forms no part of this disclosure.

In the particular case under discussion it will be understood that as the bar 32 advances from the position shown in Figure 3, it passes thru and beyond the unmachined bearing $d$, but preferably not rotating until it comes in contact with the auxiliary tool shown in Figure 4, when bar 32 begins to rotate. The coupling lugs then engage and slide down the inclines 52 and are projected into the slots 53 either by the direct action of the advancing bar or by the reaction of the compressed spring 43. In this way rotary movement is transmitted from the bar 32 now acting as a power shaft to the auxiliary tool 47. At the same time the advancing key has displaced the locking-member-holding follower from the position shown in Figure 4 into the position shown in Figure 5 and the succeeding advancing movement of the bar 32 acts on the locking rollers 41 to move the same out of their holding groove 53' thus permitting a longitudinal advance of the auxiliary cutting tool as well as the rotary cutting movement. This longitudinal advance brings the cutter 58 into machining engagement with the bore $d'$ and this bore is machined at the same time that bore $d$ is being machined by the primary cutter thus causing both cutting operations to proceed simultaneously. The advance of the secondary tool will of course be controlled by the advance of the front head 13 and the movement thereof controlled by the elements which control the advance on the screw 23. It is of course obviously within the scope of the disclosure to design the advance end of the secondary tool to duplicate the described advance end of the primary boring bar 32 shown in Figure 3 and to cause the secondary tool to move into driving relation with still another succeeding cutting tool so as to machine a fourth bearing in line. In this way the construction described can be multiplied to machine any desired number of aligned holes or bearings.

It is part of the main machine construction to automatically reverse the movement of the head 13 when it has completed its operative movement in one direction and again referring to Figure 5 it will be noted that the reverse movement of the bar 32 will carry with it the secondary tool 47 and move the same towards its initial position shown in Figure 4. When the auxiliary tool reaches the position shown in Figure 4 the locking members 41 will be forced into the groove 53' and will be held therein by the replacement of the follower under the influence of its tension spring 57. The continued outward movement of the bar 32 will withdraw the same from the secondary tool and the parts will eventually be replaced in the initial position shown in Figures 3 and 4. The machined casing is then removed and on the replacement of another similar casing the operation is repeated.

By means of a device such as is disclosed it is possible to form holes, bearings or similar cylindrical openings in accurate alignment so that drillings can be effected at points spaced apart any desired distance, or on the contrary, the machining can be effected at points positioned relatively close together, simply conditioned that there must be sufficient room to accommodate the necessary tool and its bearing. As each cutting tool is held fixed relative to its axis of rotation and in close proximity to the work on which it is operating, the possibility of vibratory movement, chattering or strain on the tool is minimized, resulting in a better machining operation than has been heretofore possible in locations such as have been hereinbefore defined.

Having thus described my invention, I claim:

1. In a machine for cutting a pair of holes disposed in axial alignment, the combination of a cutting means for cutting one of the holes, a second cutting means separate from the first named cutting means and adapted to be rotated independent thereof for cutting the other hole and coupling means for connecting the two cutting means end to end to drive one from the other.

2. In a device for machining two holes disposed in axial alignment, the combination of means for machining one of the holes, a power means operatively connected to said means for causing the same to function, a second means complete in itself for machining the other hole and disposed in alignment with the first named means, a coupling adapted to connect the second hole machining means to the first named means at the completion of the machining of the first named hole whereby the second means is driven from the power means acting through the first named hole machining means.

3. In a device for machining two aligned spaced apart holes, the combination of a pair of separate means each adapted to machine its respective hole and a coupling for connecting said means in alignment thereby to drive one from the other and a power means operatively connected to one of said hole machining means.

4. In a device for machining two aligned spaced apart holes, the combination of a pair of separate means each adapted to machine its respective hole, each of said separate means provided with a guide for insuring the alignment of the same and a coupling for connecting said means in alignment thereby to drive one from the other and a power means operatively connected to one of said hole machining means.

5. In a device of the class described, the combination of two machining tools, each mounted for rotary movement about a common axis of rotation, guiding means for the tools longitudinally spaced apart to permit the insertion between the guiding means of part of the device to be machined, means for driving one of the tools in its operating movement towards the other tool and means for coupling the driving tool to said other tool thereby to cause the last named tool to function following the completion of the machining function of the driving tool.

6. In a device of the class described, the combination of two spaced apart bearings having a common axis, a pair of normally separated cutting tools, shiftable axially relative to each other and one mounted for rotary movement in each of said bearings, means for connecting the tools at will to cause them to rotate together and a power means for rotating the connected tools each in its respective bearings.

7. In a machine of the class described, the combination of a plurality of machining tools spaced apart in alignment and each provided with means for maintaining the alignment, said tool-aligning-means being spaced apart to accommodate therebetween work parts to be machined, and means for causing one of the tools to connect with the next succeeding tool in longitudinal order to cause said succeeding tool to function following the functioning of the preceding tool.

8. In a machine of the class described, the combination of a plurality of machining tools spaced apart in alignment and each provided with means for maintaining the alignment, said tool-aligning-means being spaced apart to accommodate therebetween work parts to be machined, means for causing one of the tools to connect with the next succeeding tool in longitudinal order to cause said succeeding tool to function following the functioning of the preceding tool and means for causing each tool to resume automatically its initial position relative to its aligning means on the reverse movement of the connected tools.

9. In a device of the class described, the combination of a driving and a driven shaft, spaced apart bearings for maintaining the same in axial alignment, power means operatively connected to the driving shaft to rotate the same and to feed the same axially relative to the driven shaft, said driven shaft provided with a cutting tool disposed in relatively close relation to the aligning means for the driven shaft thereby to minimize chattering of the cutting tool and means for driving one shaft from the other, said driving shaft provided with a cutting tool disposed in relatively close relation to the aligning means for the driving shaft.

10. In a device for machining a plurality of closely positioned and axially aligned apertures, the combination of a driving and a driven shaft, spaced apart bearings maintaining the same in axial alignment, power means operatively connected to the driving shaft to rotate the same and to feed the same automatically and axially relative to the driven shaft, said shafts being each provided with a cutting tool disposed in relatively close relation to the aligning means for the shafts thereby to minimize chattering of the cutting tool and means controlled by the position of the driving shaft and operatively disposed when within the bearing for the driven shaft for coupling the shafts and thus driving one shaft from the other.

11. In a device of the class described, the combination with a plurality of boring tools movable axially relative to each other in their boring operations, said tools physically dissociated from each other to provide work receiving spaces between the tools when considered in their axial relation and each designed for boring one of three axially spaced apart holes, separate means adjacent each boring tool for fixing the axis of the same against vibration relative to the common axis of the holes, thereby to insure that the spaced borings will be concentrically disposed relative to said axis, means for causing each succeeding tool to be driven by the one behind and means for driving the rearmost tool.

12. In a device of the class described, the combination with a machining tool, means for mounting the same for rotary movement about a fixed axis, means within the outline of the mounting means for locking the tool relative to the mounting means for accidental movement in both directions, a power member mounted for rotary movement and movable bodily to and from the machining tool and along the axis of rotation of the machining tool and means operatively responsive to the engagement of the power member with the machining tool for automatically moving the locking means into inoperative position and for coupling the member whereby the power member can drive the machining tool.

13. In a device of the class described, the combination with a machining tool mounted for rotary movement about a horizontally disposed axis of rotation and movable longitudinally along said axis while functioning, means normally locking the tool against said longitudinal movement, a power member including a cutting tool mounted for both rotary and longitudinal movement relative to said axis, said power member having a freedom of movement independent of the tool when in spaced relation thereto whereby the force of the power member may be utilized initially to cause its cutting tool to function independently of the machining tool and a coupling connection between the power member and the tool operatively responsive to the interengaging of the tool and member and directly engaging said locking member to move the same positively into an inoperative position and thus permit the power member to drive the tool.

14. In a machine of the class described, the combination of a shaft guide, a combined power shaft and tool mounted therein and adapted to project from one side thereof, the projecting end of the shaft provided with a tool driving means, a tool guide facing said side and disposed in spaced relation thereto to accommodate work parts between the shaft guide and tool guide, a machining tool mounted in said guide for rotary movement about the axis of the power shaft and provided with means adapted to be engaged by the tool driving means on the power shaft.

15. In a device of the class described, the combination of a bearing, a power member mounted therein for rotary and longitudinal movement, a driving coupling carried by the member adjacent the advance end thereof, a second bearing spaced longitudinally from the first named bearing to accommodate work parts therebetween, a tool mounted for rotary and longitudinal movement in said second bearing, said tool provided with means coacting with said driving coupling whereby the power member can rotate and advance the tool after the advance end of the power member has passed the interposed work.

16. In a device of the class described, the combination of a primary tool mounted for rotary and longitudinal movement and provided with an element of a shaft coupling means for driving the primary tool, a secondary tool, a bearing for locating the axis of rotation of the secondary tool in line with the axis of rotation of the primary tool, said bearing having a bore containing the secondary tool and adapted to receive in one end thereof the part of the primary tool provided with the coupling element, said secondary tool provided with means adapted to coact with the element to complete the coupling between the tools.

17. In a device of the class described, the combination of a pair of longitudinally spaced apart tools having a common axis of rotation and adapted to accommodate therebetween work to be machined by one of the tools, and means carried by said tool for coupling the same automatically to the other tool when the advanced end of said first named tool has passed the work.

18. In a device of the class described, the combination of a power member mounted for rotary and longitudinal movement and provided with an element of a shaft coupling, a tool, a bearing for locating the axis of rotation of the tool in line with the axis of rotation of the power member, said tool provided with means adapted to coact with the element to complete the coupling between the power member and the tool and locking means for securing the tool relative to its bearing for resisting axial movement in both directions, while permitting a restrained freedom of rotary movement.

19. In a device of the class described, the combination of a power member mounted for rotary and longitudinal movement and provided at one end with an extension constituting an element of a shaft coupling, a tool, a bearing for locating the axis of rotation of the tool in line with the axis of rotation of the power member, said bearing having a bore containing the tool and adapted to receive in one end thereof the extension part of the power member provided with the coupling element, said tool provided with means adapted to coact with the element to complete the coupling between the power member and the tool, locking means for securing the tool relative to its bearings, and against longitudinal movement in both axial directions until the power member is in driving engagement therewith and means controlled by the extension from the member for engaging the locking means to move the same positively into an inoperative position.

20. In a device of the class described, the combination of a bearing open at one end, a tool mounted thereon for rotary and longitudinal movement, means confined within the outlines of the bearing for locking the tool axially in the bearing while permitting a restrained rotary movement, a power member adapted to enter the open end of the bearing and move into coupling connection with the tool to actuate the same, said member provided at its advance end with means for entering the tool and releasing the locking means and thus permit the power member to move the tool relative to its bearing.

21. In a device of the class described, the combination of a bearing open at one end, a tool mounted thereon for rotary and longitudinal movement, means for locking the tool axially in the bearing while permitting a restrained rotary movement, a power member adapted to enter the open end of the bearing and move into coupling connection with the tool to actuate the same, said member provided with means for releasing the locking means in advance of the engagement of the power member and tool to effect their coupling connection and thus permit the power member to move the tool relative to its bearing following the release of the locking means and means for restoring the locking means into its operative condition when free of the releasing action of the power member.

22. In a device of the class described, the combination of a bearing with a work space immediately adjacent thereto on opposite sides thereof, a cutting tool rotatably mounted in said bearing whereby the tool is disposed in close proximity to the work in either of said spaces, a power means normally disconnected from the tool and adapted to pass idly through one of said spaces, and a coupling for connecting the power means with the tool automatically to drive the same when brought into engagement therewith.

23. In a device of the class described, the combination of a pair of spaced apart aligned bearings, a primary tool mounted in one of said bearings and a secondary tool mounted in the other of said bearings, means for advancing the primary tool into bearing engagement with the secondary tool to advance the same longitudinally in its bearing, means controlled by the displaced position of the secondary tool for causing the same to be drawn into its initial position by the retreat of the primary tool.

24. In a device of the class described, the combination of a pair of spaced apart aligned bearings, a primary tool mounted in one of said bearings and a secondary tool mounted in the other of said bearings, means for advancing the primary tool into bearing engagement with the secondary tool to advance the same longitudinally in its bearing, means controlled by the displaced position of the secondary tool for causing the same to be drawn into its initial position by the retreat of the primary tool and means controlled by the movement of the secondary tool into its initial position for disconnecting the tools.

25. In a device of the class described, the combination of a pair of spaced apart aligned bearings, a primary tool mounted in one of said bearings and a secondary tool mounted in the other of said bearings, means for advancing the primary tool into bearing engagement with the secondary tool to advance the same longitudinally in its bearings, means controlled by the displaced position of the secondary tool for causing the same to be drawn into its initial position by the retreat of the primary tool, means controlled by the movement of the secondary tool into its initial position for disconnecting the tools and means for automatically locking the secondary tool in its normal inoperative position when free of the primary tool.

26. In a device of the class described, the combination with a pair of bearings longitudinally spaced apart, tools mounted in each of said bearings, a power shaft operatively connected to one of the tools, means for moving the power shaft into driving connection with the other tool and means for automatically disconnecting said power shaft from said other tool at the completion of a cycle of movement of said other tool.

Signed at New York city, in the county of New York and State of New York, this 2nd day of April, A. D. 1920.

HIRAM L. WALKER.